Jan. 13, 1959     L. E. RUSSELL     2,868,229
EXHAUST DEFLECTOR
Filed Nov. 16, 1955
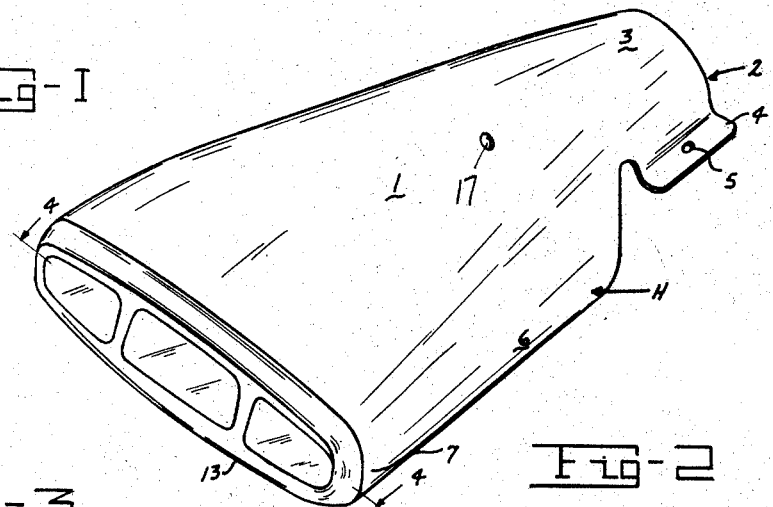
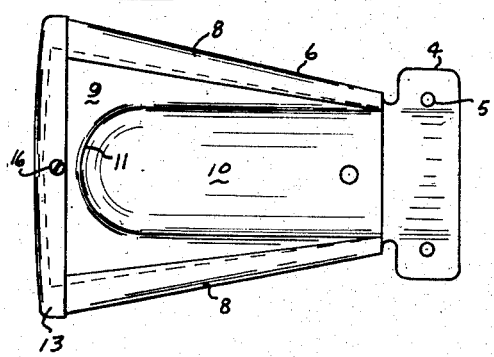
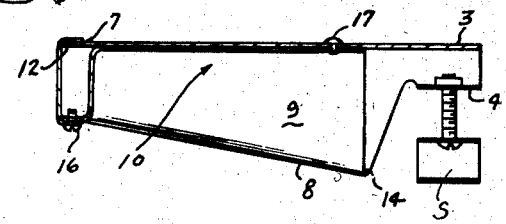
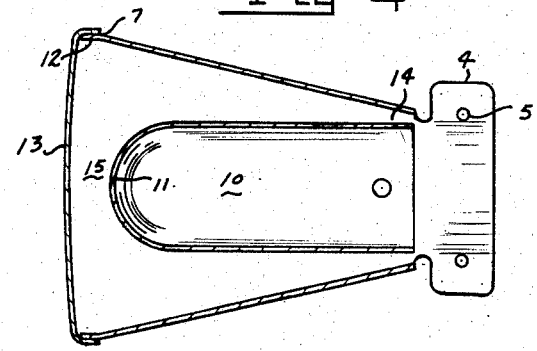
INVENTOR.
LINUS E. RUSSELL
BY Tom Walker
ATTORNEY

United States Patent Office 2,868,229
Patented Jan. 13, 1959

2,868,229

EXHAUST DEFLECTOR

Linus E. Russell, Springfield, Ohio, assignor to Peters & Russell, Inc., Springfield, Ohio, a corporation of Ohio Application November 16, 1955, Serial No. 547,099

6 Claims. (Cl. 138—46.5)

This invention relates to a new and improved exhaust deflector particularly applicable to automotive vehicles.

The deflector unit herein disclosed has a distinct advantage due to its simplicity of construction. The present deflector unit affords an improved insulation of the tail pipe of an automobile from both the adjacent parts of the automobile and the outer surface of the deflector. Due to its simplicity of construction the improved unit provides a highly efficient and economical deflection and dispersal of exhaust gases.

The object of the invention is to simplify the construction as well as the means and mode of operation of exhaust deflectors, whereby such deflectors may not only be economically manufactured, but will be more efficient and satisfactory in use, adaptable to a wide variety of applications, and be unlikely to get out of repair.

A further object of the invention is to provide an exhaust deflector of a simplified nature introducing new speed and economy in the fabrication thereof on a production basis.

Another object of the invention is to provide an improved exhaust deflector which is so designed as to provide a rapid, effective and safe dispersal of exhaust gases issuing from the exhaust pipe to which the deflector is mounted.

A further object of the invention is to provide in an exhaust deflector a more effective insulation of the tail pipe to which it is attached, thereby preventing damage to adjacent vehicle structure and trim.

A further object of the invention is to provide an exhaust deflector possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing, wherein is shown one but obviously not necessarily the only form of embodiment of the invention, Fig. 1 is a top perspective view of the improved exhaust deflector as provided by the invention;

Fig. 2 is a longitudinal cross-sectional view of the deflector unit as shown in Fig. 1;

Fig. 3 is a bottom view of the deflector unit of Fig. 1; and

Fig. 4 is a cross-sectional view of the deflector unit shown in Fig. 1 taken along line 4—4 thereof.

Like parts are indicated by similar characters of reference throughout the several views.

The improved exhaust deflector forming the subject matter hereof consists of an upper formed cover plate 1 which is generally fan shaped in outline. Extending from the narrowed inner end thereof and integrally formed therewith is an adapter section 2. This section includes an extension 3 of generally arcuate shape enabling it to seat on and closely engage the exhaust duct or tail pipe of an automotive vehicle. Laterally extending ears 4 are provided on the extension 3 which have apertures 5 therein for purposes to be described.

The cover plate 1 is appropriately formed from a generally rectangular plate. Rearwardly from the adapter section 2 in longitudinally spaced relation to the ears 4 thereon, the plate 1 is provided with depending integral side sections 6. Such side sections are of progressively decreasing extent from the adapter section 2 to the outer widened end 7 of the cover plate 1. The lateral extremities 8 of the side sections 6 are bent inwardly towards each other in a common plane to provide support rails for a deflector plate 9.

The deflector plate 9 has a peripheral configuration generally similar to that of the cover plate 1.

The angled lateral extremities of the deflector plate 9 seat on the similarly angled rails provided by the lateral extremities 8 of the cover plate. The deflector plate 9 is formed so that the major central portion thereof is deeply recessed to form a longitudinal cavity 10 therein. This provides a generally inverted U-shaped cross section to the deflector plate for the greater portion of its length. The cavity 10, which is short of the outer, wider end of the deflector plate, is closed by a curved wall 11 at the outer end thereof.

The upper surface of the deflector plate 9, in the region of the cavity therein, abuts the inner surface of the cover plate centrally thereof. The plate 9 is mounted within the cover plate by sliding it inwardly thereof on the integral rail portions provided by the lateral extremities 8. This provides a tight frictional engagement between the plates and provides an insulating housing H thereby.

The outer end of the plate 1 has a co-planar projection 12 extending therefrom. The lateral extremities 8 of the plate 1 have similar projections. An end cap 13 of substantially elongated elliptical configuration, conforming generally to the outer open end of the housing H, frictionally engages about the projection 12, the extensions of the lateral extremities 8 and the end of deflector plate 9. The end of the housing is thereby closed with the cover plate, the deflector plate and the end cap held in relatively fixed relation. To maintain the parts in assembled position, a screw 16 interconnects cap 13 with deflector plate 9, and a rivet 17 interconnects the plate 9 with cover plate 1.

This assembly of the end cap to the cover and deflector plates provides the housing H with laterally spaced passages 14 on either side of the central cavity in the deflector plate. These passages 14 at the inner end of the housing are narrow and have maximum depth due to the inclination of the sides 6 on the cover plate. The depth of the passages to the outer ends thereof accordingly decrease, but expand substantially in a lateral direction to afford greater cross section thereto. The outer ends of passages 14 beyond the cavity in the deflector plate are connected by a lateral passage 15 adjacent the end cap 13 on the housing.

In use the exhaust deflector is mounted on the end of the tail pipe of an exhaust system so as to partially overlie the open end thereof. The tail pipe is received in the cavity 10 provided by the deflector plate 9 in the bottom of the deflector housing unit H. The pipe extends from the inner end of the deflector unit to a point spaced slightly from the end wall 11. Thus, the housing H and the adapter extension 3 thereof are supported on the tail pipe of the exhaust system. A strap element S is arranged under the tail pipe in alignment with the lateral ears 4 on the overlying extension 3 and connected thereto by bolts through the apertures 5 therein. In this fashion the exhaust deflector unit is fixed in operative position.

The inclination of the under surface of the deflector unit as produced by the depending sides 6 thereof provides that the open end of the supporting tail pipe element projects a small amount below the bottom of the housing, as may be readily apparent with reference to Fig. 2 of the drawings.

As the hot exhaust gases are projected through the pipe, they cause considerable heat transfer and radiation. The deflector unit not only deflects and disperses the hot gases issuing from the tail pipe in a rapid efficient manner, but also insulates the tail exhaust pipe and prevents damage to adjacent vehicle structure and trim thereby. This is particularly important where there is chrome trim which is susceptible to deterioration from the hot exhaust gases.

In a moving automobile, for example, the surrounding air adjacent the tail pipe is accelerated into the passages 14 in the housing about the pipe. These gases are then expanded through the connecting passage 15 therein. This provides an insulating layer of air around the tail pipe that prevents the extreme heat of the exhaust gases from being transferred to the outer surface of the cover plate on the housing and radiating to adjacent structure and trim. Simultaneously, in cooperation with this insulating action, the hot gases as they are projected from the tail pipe impinge on the insulated curved wall 11 provided by the cavity in the deflector unit, and are deflected thereby. Since a portion of the tail pipe is below the bottom surface of the housing, the portion of the exhaust gases discharged therefrom under the insulated depending end of the housing, pick up the gases deflected by the wall 11 to accelerate the deflection and effect dispersal of all gases clear of adjacent structure.

The insulating layer of air provided by the deflector housing, of course, will be constantly replenished with fresh air maintaining its insulating efficiency. If desired, the end cap 13 may be provided with spaced apertures therein for accelerated passage of the insulating air through the housing.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An exhaust deflector unit comprising a cover plate having integral depending side portions of substantial longitudinal extent with the lateral extremities thereof extending towards each other, a formed deflector plate received in said cover plate and having depending side portions of substantial longitudinal extent supported on said lateral extremities coextensive therewith and connected thereto, said deflector plate having a hollow in the under surface thereof from one end to a point spaced from the other end thereof, providing connecting laterally spaced passages between said deflector plate and cover plate, the hollow in said deflector plate providing a deflecting wall at the inner extremity thereof, and adapter means integral with said cover plate for mounting the deflector unit over the end of a tail pipe with the end of the pipe nested within the hollow in said deflector plate in spaced relation to said deflecting wall whereby insulation and deflection of the hot exhaust gases will be obtained.

2. An exhaust deflector unit, including a formed housing adapted at its one end to interfit with the tail pipe of an exhaust system, the opposite end of said housing being relatively flared and tapering toward said one end, said housing having depending side portions the extremities of which extend laterally toward one another in a common plane, a deflector plate wholly received in and enclosed by said housing, said plate being supported on said side portions and formed with a recess opening longitudinally through said one end of the housing to receive the gases issuing from the tail pipe, said recess terminating short of the opposite end of the housing to define a wall deflecting the gases downward.

3. An exhaust deflector unit according to claim 2, characterized in that the recessed portion of said deflector plate has the shape in cross section of an inverted U with the base thereof in substantially line longitudinal contact with said housing and with the sides thereof in spaced relation to the side portions of said housing, the extremities of the sides of said recessed portion extending laterally as flanges to rest on the laterally extending extremities of the side portions of said housing.

4. An exhaust deflector unit including a cover plate adapted for mounting on a tail pipe and having integral depending side portions the extremities of which are turned laterally inward toward the longitudinal axis of the cover plate, a deflector plate received in and enclosed by said cover plate comprising a longitudinal recessed portion having in cross section substantially the shape of an inverted U, the sides of said recessed portion terminating in flanges extending laterally outward and resting on the inturned extremities of said cover plate, the recessed portion of said deflector plate being open at its one end and terminating at its other end in a wall extending downwardly to merge with said flange.

5. An exhaust deflector unit, including a cover plate formed to define a first end to receive the tail pipe of an exhaust system and an opposite relatively broader end from which said cover plate tapers to the said first end, said cover plate being formed intermediate its ends with downwardly extending margins the extremities of which are turned inward toward the longitudinal axis of the cover plate, the underside of said cover plate between said inturned extremities being open, and a deflector plate received in and closing the underside of said cover plate, said deflector plate being wholly received in said cover plate and supported on said inturned extremities and further being formed with a recessed surface to receive and deflect exhaust gases.

6. An exhaust deflector according to claim 5, characterized by means extending transversely across the said opposite end of said cover plate providing a further support for said deflector plate, and means for detachably connecting said deflector plate to said last named means.

References Cited in the file of this patent

UNITED STATES PATENTS

| Number | Name | Date |
|---|---|---|
| D. 112,480 | Koch | Dec. 6, 1938 |
| D. 149,650 | Kelly | May 18, 1948 |
| 2,123,858 | Wightman | July 12, 1938 |
| 2,252,228 | Koch | Aug. 12, 1941 |
| 2,260,841 | Russell | Oct. 28, 1941 |
| 2,355,674 | Peter et al. | Aug. 15, 1944 |
| 2,370,737 | Koch | Mar. 6, 1945 |
| 2,674,087 | Russell | Apr. 6, 1954 |
| 2,677,929 | Russell | May 11, 1954 |